(12) United States Patent
Park (10) Patent No.: US 11,938,809 B2
(45) Date of Patent: Mar. 26, 2024

(54) UNIVERSAL DRIVING DEVICE

(71) Applicants: Hyundai Motor Company, Seoul (KR); Kia Corporation, Seoul (KR)

(72) Inventor: Jong Sool Park, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/694,133

(22) Filed: Mar. 14, 2022

(65) Prior Publication Data
US 2023/0020023 A1    Jan. 19, 2023

(30) Foreign Application Priority Data
Jul. 19, 2021   (KR) .......................... 10-2021-0094436

(51) Int. Cl.
*F16H 37/12*      (2006.01)
*B60K 7/00*       (2006.01)
*B60K 17/04*      (2006.01)

(52) U.S. Cl.
CPC .......... *B60K 17/043* (2013.01); *B60K 7/0007* (2013.01); *F16H 37/12* (2013.01)

(58) Field of Classification Search
CPC ........ F16H 1/006; F16H 37/12; F16H 37/122; F16H 37/16; F16H 1/2836; F16H 1/2845; B60K 17/043; B60K 17/046; B60B 35/125
USPC ................................................. 475/150, 343
See application file for complete search history.

(56) References Cited

U.S. PATENT DOCUMENTS

| | | | | |
|---|---|---|---|---|
| 2,144,964 A | * | 1/1939 | De Falco | F16H 1/006 74/411 |
| 3,955,435 A | * | 5/1976 | Arick | F16H 1/32 74/411 |
| 5,360,380 A | * | 11/1994 | Nottle | F16H 3/76 475/182 |
| 10,173,463 B2 | | 1/2019 | Barel et al. | |
| 10,801,583 B2 | | 10/2020 | Sardes et al. | |
| 11,571,966 B1 | * | 2/2023 | Park | F16H 1/2836 |
| 11,639,101 B1 | * | 5/2023 | Park | F16H 1/2863 475/346 |
| 2012/0015771 A1 | * | 1/2012 | Haeusler | B60K 17/046 475/183 |
| 2023/0311646 A1 | * | 10/2023 | Park | F16H 1/2863 74/409 |

FOREIGN PATENT DOCUMENTS

| | | | | |
|---|---|---|---|---|
| DE | 4427493 A1 | * | 2/1995 | .......... B60K 17/165 |
| DE | 102019119779 A1 | * | 1/2021 | .......... B60K 17/046 |
| KR | 10-2014-0062538 | | 5/2014 | |
| KR | 10-2234440 | | 3/2021 | |

* cited by examiner

*Primary Examiner* — Roger L Pang
(74) *Attorney, Agent, or Firm* — MORGAN, LEWIS & BOCKIUS LLP (57) ABSTRACT

A universal driving device includes a sun gear rotatably provided; a ring gear disposed on a rotation plane coplanar to a rotation plane of the sun gear and provided so that a rotation shaft of the ring gear is movable relative to a rotation shaft of the sun gear; and a gear train engaging the sun gear to the ring gear and configured to allow a relative motion between the rotation shaft of the sun gear and the rotation shaft of the ring gear and define a continuous power transmission state between the sun gear and the ring gear.

20 Claims, 5 Drawing Sheets

UNIVERSAL DRIVING DEVICE

CROSS REFERENCE TO RELATED APPLICATION

The present application claims priority to Korean Patent Application No. 10-2021-0094436, filed Jul. 19, 2021, the entire contents of which is incorporated herein for all purposes by this reference.

BACKGROUND OF THE INVENTION

Field of the Invention

The present invention relates to a technology related to a driving device that receives power from a rotational power source such as a motor, converts the power into a rotational force, and outputs the rotational force.

Description of Related Art

A driving device for a vehicle is configured to operate the vehicle by supplying wheels with power from a rotational power source such as an engine or a motor.

Recently, an in-wheel motor type driving device, which has a motor directly installed in a driving wheel, has been provided. However, the in-wheel motor driving device cannot be widely used because of a problem with durability of the motor, a problem with ride quality caused by an increase in unsprung mass, and the like.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a universal driving device that receives power from a rotational power source such as a motor, converts the power into a rotational force, and outputs the rotational force. The present invention also aims to provide a universal driving device which is applied to a vehicle and appropriately provides a gear ratio inputted power, ensuring excellent slope climbing and acceleration performance. The present invention also aims to provide a universal driving device which may be provided separately from a wheel receiving severe impact and vibration from a road, improving durability of the power source such as a motor and ensuring excellent ride quality implemented by reducing unsprung mass of a vehicle. The present invention also aims to provide a universal driving device which may continuously transmit power from a power source in accordance with a vertical motion of a wheel without using a constant velocity joint, reducing a space between the power source and the wheel and ensuring excellent spatial utilization between a left wheel and a right wheel.

Various aspects of the present invention provide a universal driving device including: a sun gear rotatably provided; a ring gear disposed on a rotation plane coplanar to a rotation plane of the sun gear and provided so that a rotation shaft of the ring gear is movable relative to a rotation shaft of the sun gear; and a gear train engaging the sun gear to the ring gear and configured to allow a relative motion between the rotation shaft of the sun gear and the rotation shaft of the ring gear and define a continuous power transmission state between the sun gear and the ring gear.

The gear train may include a plurality of links having connection angles that vary depending on the relative motion between the rotation shaft of the sun gear and the rotation shaft of the ring gear.

The plurality of links may include: a first link connected to the rotation shaft of the sun gear; and a second link connected to the first link, and a joint pinion having a same number of teeth as the sun gear may be provided on a connecting portion between the first link and the second link.

A final pinion may be disposed on the second link and engage with the ring gear, and the final pinion may have the same number of teeth as the sun gear.

The final pinion may be configured to transmit power to the ring gear through a series of gears connected from the sun gear to the joint pinion.

The gear train may be provided in plural.

Rotation shafts of the final pinions of the plurality of gear trains may be supported on a carrier.

The plurality of links may include: a first link connected to the rotation shaft of the sun gear; and a second link connected to the first link, and rotation shafts of a series of gears may be provided on the first link and the second link to transmit power from the sun gear to the ring gear.

The gears, which are disposed at even-numbered positions from the sun gear among the series of gears forming the gear train, may have the same number of teeth as the sun gear.

A gear, which is disposed at a second position from the sun gear, may be a joint pinion provided coaxially with a rotation shaft of the first link and a rotation shaft of the second link, and a gear, which is disposed at a fourth position from the sun gear, may be a final pinion that engages with the ring gear.

A first intermediate pinion having a rotation shaft provided on the first link may engage with the sun gear and the joint pinion, and a second intermediate pinion having a rotation shaft provided on the second link may engage with the joint pinion and the final pinion.

The gear train may be provided in plural, and the final pinions of the gear trains may be supported on a carrier so that relative positions between the final pinions are constantly maintained and only the rotations of the final pinions about their own axes are allowed.

The gear train may include at least four pinions continuously engaging with one another, and rotation shafts of the pinions may be rotatably supported on the plurality of links connected continuously.

The gear train may be configured to constantly maintain a relative phase between the sun gear and the ring gear with respect to the relative motion in an upward/downward direction between the rotation shaft of the sun gear and the rotation shaft of the ring gear.

A final pinion, which is a pinion engaging with the ring gear among the pinions, may be supported on a carrier so that the final pinion is inhibited from rotating about the sun gear and only allowed to rotate about an axis of the final pinion.

The gear train may be provided in plural, and the plurality of gear trains may be symmetric in a circumferential direction of the sun gear.

The gear train may be provided in plural, and the plurality of gear trains may be asymmetric in a circumferential direction of the sun gear.

A power source may be connected to the sun gear, a load may be connected to the ring gear, and rotation speed from the power source may be decelerated and transmitted to the load.

A power source may be connected to the ring gear, a load may be connected to the sun gear, and rotation speed from the power source may be accelerated and transmitted to the load.

A rotation shaft of a motor may be connected to the sun gear, and a wheel may be connected to the ring gear.

According to various exemplary embodiments of the present invention, the universal driving device is applied to a vehicle and appropriately provides a gear ratio, ensuring excellent slope climbing and acceleration performance. Furthermore, the universal driving device may be provided separately from a wheel receiving severe impact and vibration from a road, improving durability of the power source such as a motor and ensuring excellent ride quality implemented by reducing unsprung mass of a vehicle. Furthermore, the universal driving device may continuously transmit power from a power source in accordance with a vertical motion of a wheel without using a constant velocity joint, reducing a space between the power source and the wheel and ensuring excellent spatial utilization between a left wheel and a right wheel.

Furthermore, the universal driving device decelerates or accelerates a rotational force generated by a device other than a vehicle. The universal driving device defines a continuous power transmission state while absorbing free relative displacement between the rotation shaft of the power source and the rotation shaft of the load.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural or functional descriptions of exemplary embodiments of the present invention disclosed in the exemplary embodiment or application are exemplified only for the purpose of explaining the exemplary embodiments according to various exemplary embodiments of the present invention, the exemplary embodiments according to various exemplary embodiments of the present invention may be carried out in various forms, and it should not be interpreted that the present invention is limited to the exemplary embodiments described in the exemplary embodiment or application.

Because the exemplary embodiments according to various exemplary embodiments of the present invention may be variously changed and may have various forms, specific exemplary embodiments will be illustrated in the drawings and described in detail in the exemplary embodiment or application. However, the descriptions of the specific exemplary embodiments are not intended to limit exemplary embodiments according to the concept of the present invention to the specific exemplary embodiments of the present invention, but it should be understood that the present invention covers all modifications, equivalents and alternatives falling within the spirit and technical scope of the present invention.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present invention, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the exemplary embodiment are used to just describe a specific embodiment and do not intend to limit the present invention. Singular expressions include plural expressions unless clearly described as different meanings in the context. In the exemplary embodiment, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which various exemplary embodiments of the present invention pertains. The terms such as those defined in a commonly used dictionary should be interpreted as having meanings consistent with meanings in the context of related technologies and should not be interpreted as ideal or excessively formal meanings unless explicitly defined in the exemplary embodiment of the present invention.

Hereinafter, an exemplary embodiment of the present invention will be described in detail with reference to the accompanying drawings. Like reference numerals indicated in the respective drawings refer to like members.

All embodiments of a universal driving device according to various exemplary embodiments of the present invention illustrated in FIGS. 1 to 7 include, in common, a sun gear S rotatably provided; a ring gear R disposed on a rotation plane parallel to a rotation plane of the sun gear S and having a rotation shaft configured to move relative to a rotation shaft of the sun gear S; a gear train 1 configured to allow a relative motion between the rotation shaft of the sun gear S and the rotation shaft of the ring gear R and define a continuous power transmission state between the sun gear S and the ring gear R.

That is, according to various exemplary embodiments of the present invention, the rotation shaft of the sun gear S and the rotation shaft of the ring gear R are kept parallel to each other and allow relative displacement. Despite the relative displacement between the sun gear S and the ring gear R, the gear train 1 consistently maintains the state in which the sun gear S and the ring gear R may transmit power therebetween.

The gear train 1 includes a plurality of links having connection angles that vary depending on the relative motion between the rotation shaft of the sun gear S and the rotation shaft of the ring gear R.

The plurality of links may include a first link 3 connected to the rotation shaft of the sun gear S, and a second link 5 connected to the first link 3. Rotation shafts of a series of gears configured for transmitting power from the sun gear S to the ring gear R are provided on the first link 3 and the second link 5. A joint pinion 7 having the same number of teeth as the sun gear S is provided on a connecting portion between the first link 3 and the second link 5.

The second link 5 has a final pinion 9 engaging with the ring gear R, and the final pinion 9 has the same number of teeth as the sun gear S.

Therefore, the final pinion 9 may transmit the power to the ring gear R through the series of gears disposed from the sun gear S to the joint pinion 7. The sun gear S, the joint pinion 7, and the final pinion 9 may have the same number of teeth.

As described above, the sun gear S, the joint pinion 7, and the final pinion 9, which are gears disposed at even-numbered positions from the sun gear S among the series of gears forming the gear train 1, need to have the same number of teeth to enable the relative motion of the ring gear R to the sun gear S and maintain the continuous power transmission state between the sun gear S and the ring gear R when the gear train 1 is provided in plural.

A first intermediate pinion 11 having a rotation shaft provided on the first link 3 engages with the sun gear S and the joint pinion 7. A second intermediate pinion 13 having a rotation shaft provided on the second link 5 engages with the joint pinion 7 and the final pinion 9.

Therefore, the power from the sun gear S may be transmitted to the ring gear R sequentially through the first intermediate pinion 11, the joint pinion 7, the second intermediate pinion 13, and the final pinion 9.

In the case in which the plurality of gear trains 1 is provided as described above, the final pinions 9 of the plurality of gear trains 1 are rotatably supported on a carrier C so that the relative positions between the final pinions 9 of the plurality of gear trains 1 are constantly maintained and only the rotations of the final pinions 9 about their own axes are allowed.

Figure 1:
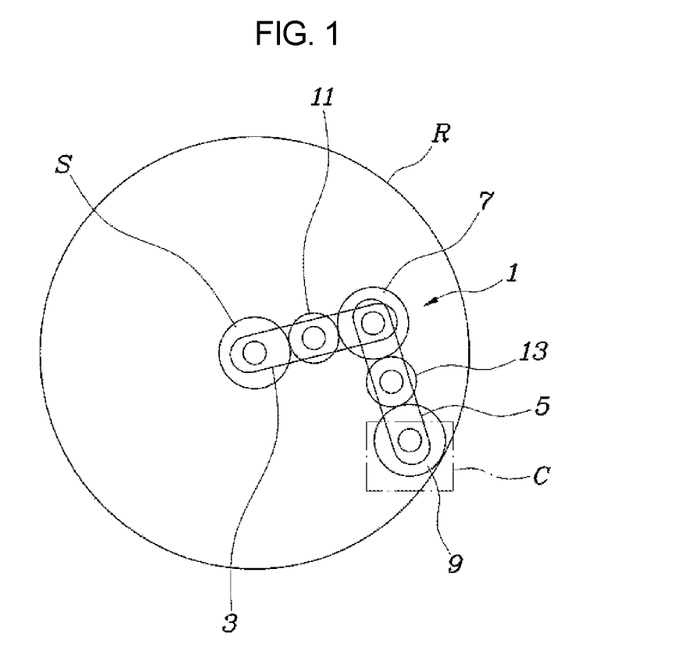
FIG. 1 is a view exemplarily illustrating various exemplary embodiments of a universal driving device according to various exemplary embodiments of the present invention.

Of course, even the configuration illustrated in FIG. 1, the final pinion 9 engaging with the ring gear R is supported on the carrier C so that the final pinion 9 is inhibited from rotating about the sun gear S and allowed to rotate about an axis of the final pinion.

Figure 2:
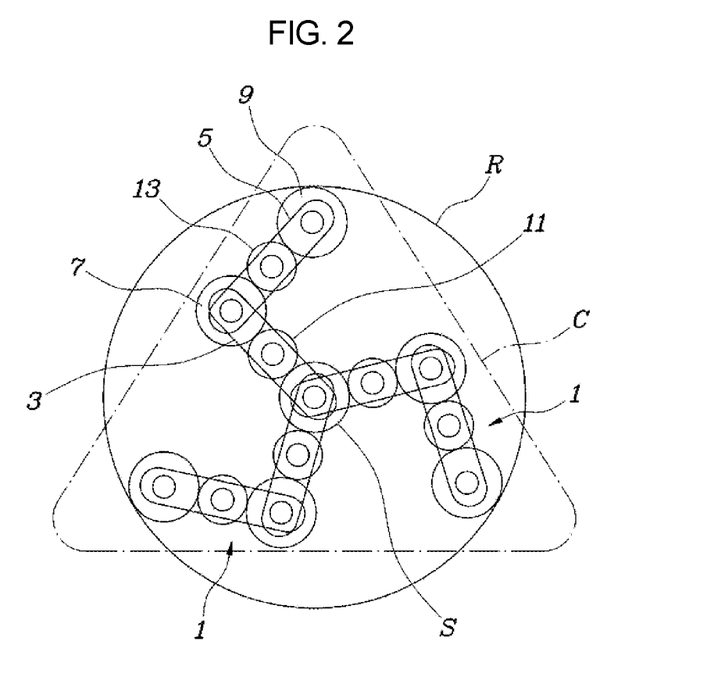
FIG. 2 is a view exemplarily illustrating various exemplary embodiments of the universal driving device according to various exemplary embodiments of the present invention.

Meanwhile, as illustrated in FIG. 2, the final pinion 9 may engage with an internal portion of the ring gear R. Referring to the modified example illustrated in FIG. 6, the final pinion 9 may engage with an external portion of the ring gear R.

Figure 3:
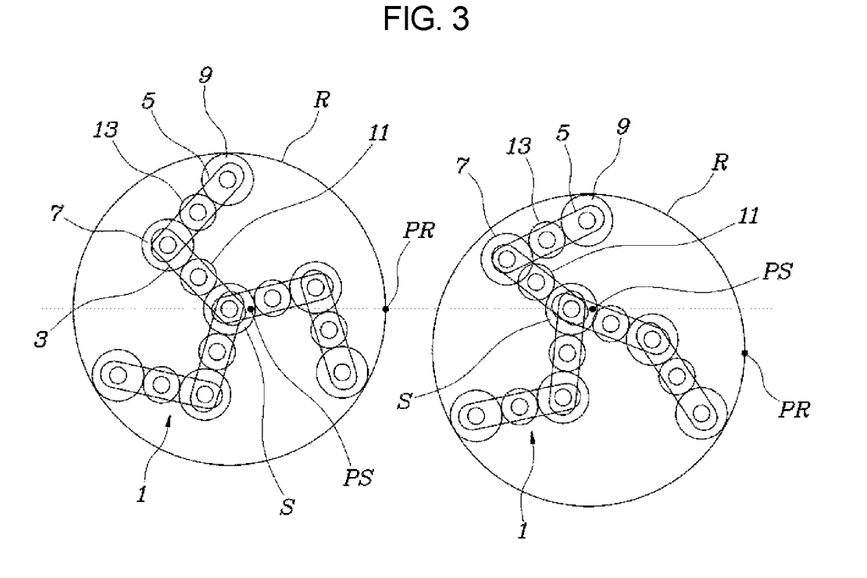
FIG. 3 is a view exemplarily illustrating the comparison between states in which a ring gear is moved downwards in accordance with the various exemplary embodiments illustrated in FIG. 2.
Figure 4:
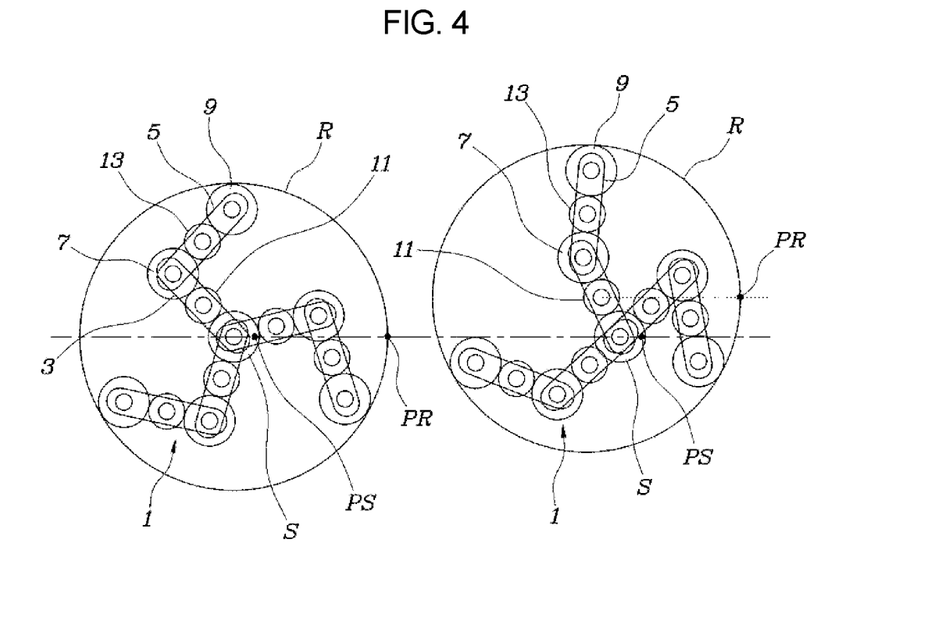
FIG. 4 is a view exemplarily illustrating the comparison between states in which the ring gear is moved upward in accordance with the various exemplary embodiments illustrated in FIG. 2.
Figure 5:
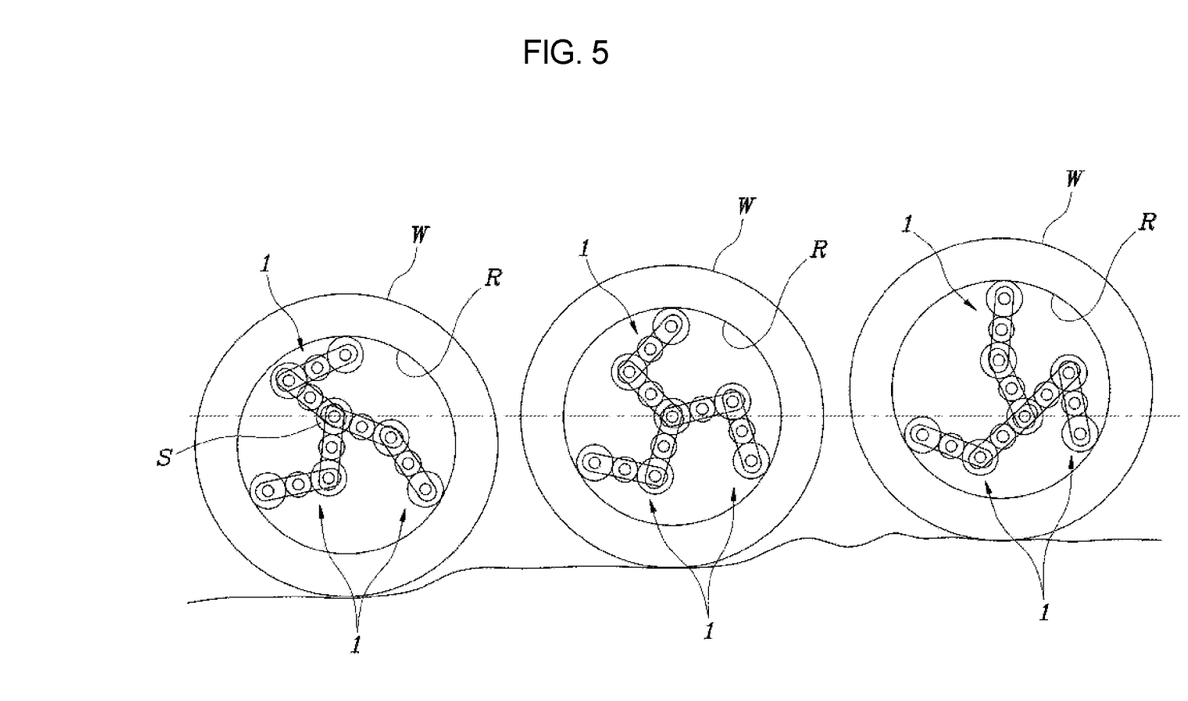
FIG. 5 is a view exemplarily illustrating an example in which the various exemplary embodiments illustrated in FIG. 2 is applied to a vehicle and showing the comparison between states in which a wheel is moved upward or downward relative to a sun gear.
Figure 6:
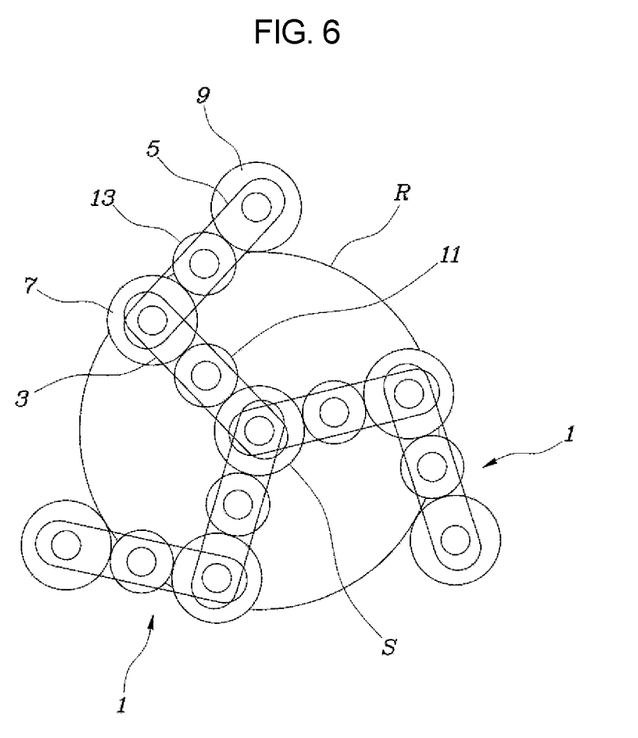
FIG. 6 is a view exemplarily illustrating a modified example of the various exemplary embodiments illustrated in FIG. 2 and showing a state in which a final pinion engages with an external portion of a ring gear.

Referring to FIG. 2 and FIG. 3, when the ring gear R is moved upward or downward relative to the sun gear S, the angles between the first links 3 and the second links 5 of the gear trains 1 are changed, the first intermediate pinions 11 are consistently kept engaging with the sun gear S, and the final pinions 9 are consistently kept engaging with the ring gear R, implementing consistent power transmission between the sun gear S and the ring gear R.

The rotation shaft of the sun gear S and the rotation shaft of the ring gear R are relatively moved in the upward/downward direction, whereas the gear train 1 constantly maintains the relative phase between the sun gear S and the ring gear R.

In the instant case, the configuration in which the relative phase between the sun gear S and the ring gear R is constantly maintained with respect to the relative motion between the sun gear S and the ring gear R may mean that the phases in the rotation direction of the points PS and PR marked at positions of 0 degree of the sun gear S and the ring gear R are constantly maintained at the positions of 0 degree even when the ring gear R is moved upward or downward relative to the sun gear S, as illustrated in FIG. 2 and FIG. 3.

That is, in various exemplary embodiments of the present invention, in the case in which the sun gear S and the ring gear R are connected to the plurality of gear trains 1, the gear trains 1 need to be configured so that the relative phase between the sun gear S and the ring gear R is constantly maintained when the ring gear R is moved upward relative to the sun gear S. Furthermore, the gear train 1 needs to be configured so that the sun gear S, the joint pinion 7, and the final pinion 9, which are gears disposed at the even-numbered positions from the sun gear S, need to have the same number of teeth as described above.

Referring to the exemplary embodiments illustrated in FIG. 2, FIG. 3, FIG. 4, FIG. 5, FIG. 6, and FIG. 7, the gear train 1 may be provided in plural, and the plurality of gear trains 1 may be symmetric in a circumferential direction of the sun gear S.

Furthermore, the plurality of gear trains 1 may be asymmetric in the circumferential direction of the sun gear S.

Figure 7:
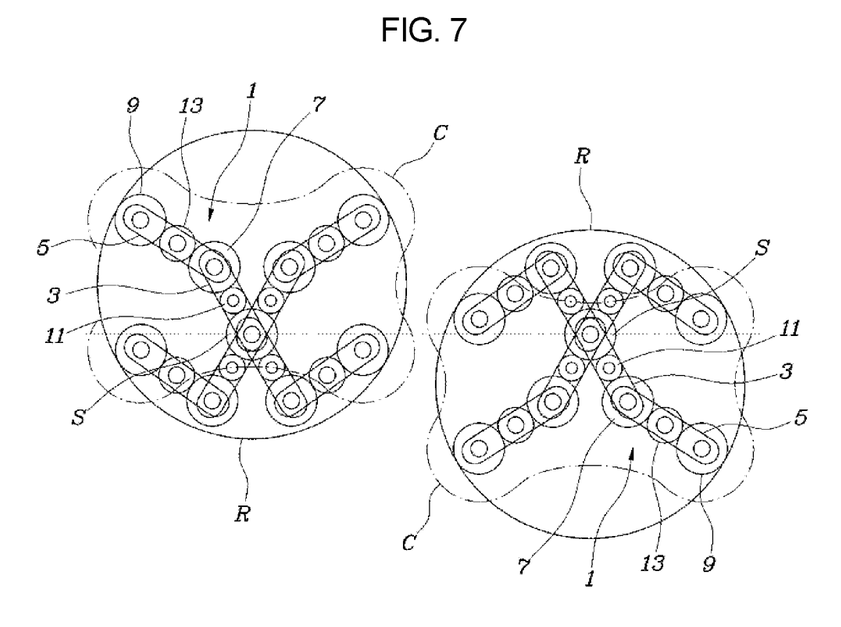
FIG. 7 is a view exemplarily illustrating various exemplary embodiments of the universal driving device according to various exemplary embodiments of the present invention and showing the comparison between states in which a ring gear is moved upward relative to a sun gear.

For reference, in various exemplary embodiments illustrated in FIG. 7, four gear trains 1 are provided, and the first intermediate pinion 11 and the second intermediate pinion 13 have different sizes and different numbers of teeth.

That is, the first intermediate pinion 11 and the second intermediate pinion 13 may have different numbers of teeth from the sun gear S, and the first intermediate pinion 11 and the second intermediate pinion 13 may have different numbers of teeth from each other as long as the joint pinion 7 and the final pinion 9 have the same number of teeth as the sun gear S.

A power source is connected to the sun gear S, and a load is connected to the ring gear R such that the rotation speed from the power source is decelerated and transmitted to the load.

Furthermore, the power source is connected to the ring gear R, and the load is connected to the sun gear S such that the rotation speed from the power source is accelerated and transmitted to the load.

Figure 8:
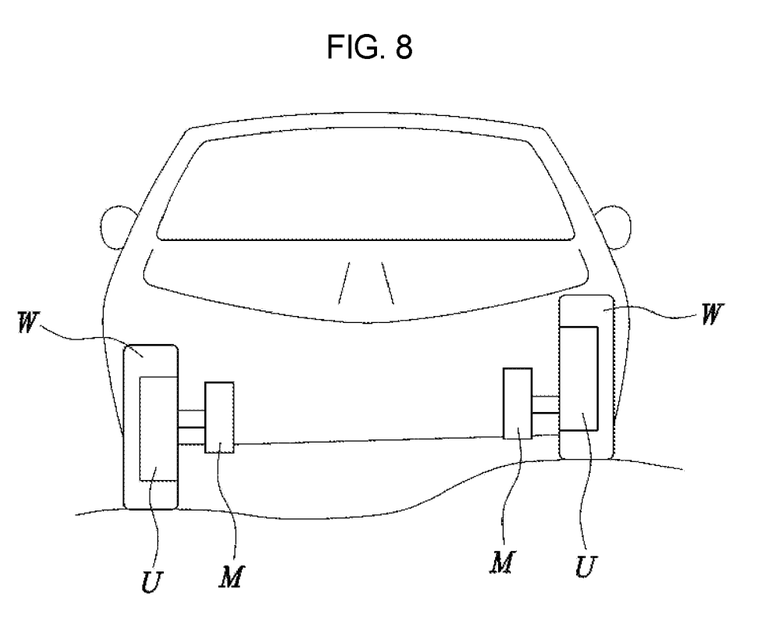
FIG. 8 is a view exemplarily illustrating an example in which the universal driving device according to various exemplary embodiments of the present invention is applied to a vehicle.

Furthermore, a rotation shaft of a motor M is connected to the sun gear S, and a wheel W is connected to the ring gear R such that the universal driving device U according to various exemplary embodiments of the present invention may be used as a driving device for a vehicle, as illustrated in FIG. 8.

In the instant case, since the rotation speed inputted to the sun gear S may be appropriately decelerated by the ring gear R, it is possible to ensure excellent slope climbing and acceleration performance of the vehicle.

Furthermore, since the motor M may be separately provided outside the wheel W without being provided in the wheel W that receives severe impact and vibration, it is possible to improve durability of the motor M and ensure excellent ride quality by reducing unsprung mass of the vehicle.

Furthermore, the ring gear R connected to the wheel W may be moved upward or downward relative to the sun gear S connected to the power source, and constant power transmission is enabled such that continuous power transmission from the power source is enabled corresponding to the vertical motion of the wheel W without using a constant velocity joint in the related art. Therefore, it is possible to reduce a space between the power source and the wheel W and thus ensure excellent spatial utilization between the left wheel W and the right wheel W.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A universal driving apparatus comprising:
    a sun gear rotatably provided;
    a ring gear in which a ring gear axis is moveable relative to a sun gear axis; and
    a gear train engaging the sun gear to the ring gear and configured to allow a relative motion between the sun gear axis and the ring gear axis and to define a continuous power transmission state between the sun gear and the ring gear.

2. The universal driving apparatus of claim 1, wherein the gear train includes a plurality of links having connection angles that vary depending on the relative motion between the sun gear axis and the ring gear axis.

3. The universal driving apparatus of claim 2,
    wherein the plurality of links includes:
        a first link, a first end of which is connected to a rotation shaft of the sun gear; and
        a second link, a first end of which is connected to a second end of the first link, and
    wherein a joint pinion having a same number of teeth as the sun gear is provided on a connecting portion of the second end of the first link and the first end of the second link.

4. The universal driving apparatus of claim 3, wherein a final pinion is disposed on a second end of the second link and engages with the ring gear, and the final pinion has a same number of teeth as the sun gear.

5. The universal driving apparatus of claim 4,
    wherein the gear train further includes a series of gears, and
    wherein the final pinion is configured to transmit power to the ring gear through the series of gears connected from the sun gear to the joint pinion.

6. The universal driving apparatus of claim 4, wherein the gear train is provided in plural.

7. The universal driving apparatus of claim 6, wherein rotation shafts of the final pinions of the plurality of gear trains are supported on a carrier.

8. The universal driving apparatus of claim 2,
    wherein the gear train further includes a series of gears, and
    wherein the plurality of links includes:

a first link connected to a rotation shaft of the sun gear; and a second link connected to the first link, and wherein rotation shafts of the series of gears are provided on the first link and the second link to transmit power from the sun gear to the ring gear.

9. The universal driving apparatus of claim 8, wherein gears, which are disposed at even-numbered positions from the sun gear among the series of gears forming the gear train, have a same number of teeth as the sun gear.

10. The universal driving apparatus of claim 9, wherein a gear, which is disposed at a second position from the sun gear, is a joint pinion provided coaxially with a rotation shaft of the first link and a rotation shaft of the second link, and a gear, which is disposed at a fourth position from the sun gear, is a final pinion that engages with the ring gear.

11. The universal driving apparatus of claim 10, wherein a first intermediate pinion having a rotation shaft provided on the first link engages with the sun gear and the joint pinion, and a second intermediate pinion having a rotation shaft provided on the second link engages with the joint pinion and the final pinion.

12. The universal driving apparatus of claim 10, wherein the gear train is provided in plural, and the final pinions of the gear trains are supported on a carrier so that relative positions between the final pinions are constantly maintained and only rotations of the final pinions about their own axes are allowed.

13. The universal driving apparatus of claim 2, wherein the gear train includes at least four pinions continuously engaging with one another, and rotation shafts of the at least four pinions are rotatably supported on the plurality of links connected continuously.

14. The universal driving apparatus of claim 13, wherein the gear train is configured to constantly maintain a relative phase between the sun gear and the ring gear with respect to the relative motion in an upward/downward direction between a rotation shaft of the sun gear and a rotation shaft of the ring gear.

15. The universal driving apparatus of claim 13, wherein a final pinion, which is a pinion engaging with the ring gear among the at least four pinions, is supported on a carrier so that the final pinion is inhibited from rotating about the sun gear and only allowed to rotate about an axis of the final pinion.

16. The universal driving apparatus of claim 1, wherein the gear train is provided in plural, and the plurality of gear trains is symmetric in a circumferential direction of the sun gear.

17. The universal driving apparatus of claim 1, wherein the gear train is provided in plural, and the plurality of gear trains is asymmetric in a circumferential direction of the sun gear.

18. The universal driving apparatus of claim 1, wherein a power source is connected to the sun gear, a load is connected to the ring gear, and a rotation speed from the power source is decelerated and transmitted to the load.

19. The universal driving apparatus of claim 1, wherein a power source is connected to the ring gear, a load is connected to the sun gear, and a rotation speed from the power source is accelerated and transmitted to the load.

20. The universal driving apparatus of claim 1, wherein a rotation shaft of a motor is connected to the sun gear, and a wheel is connected to the ring gear.

* * * * *